United States Patent
Keyl

(10) Patent No.: US 11,498,539 B2
(45) Date of Patent: Nov. 15, 2022

(54) PUMP DEVICE FOR A BRAKE SYSTEM OF A MOTOR VEHICLE, BRAKE SYSTEM

(71) Applicant: Robert Bosch GmbH, Stuttgart (DE)

(72) Inventor: Christoph Keyl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 265 days.

(21) Appl. No.: 16/899,912

(22) Filed: Jun. 12, 2020

(65) Prior Publication Data

US 2021/0016754 A1 Jan. 21, 2021

(30) Foreign Application Priority Data

Jul. 18, 2019 (DE) .................... 10 2019 210 666.8

(51) Int. Cl.
*B60T 13/16* (2006.01)
*F04B 53/10* (2006.01)
*F04B 17/04* (2006.01)

(52) U.S. Cl.
CPC .............. *B60T 13/16* (2013.01); *F04B 17/04* (2013.01); *F04B 53/10* (2013.01)

(58) Field of Classification Search
CPC ........ B60T 8/363; B60T 8/5025; B60T 13/16; B60T 17/02; F04B 17/04; F04B 17/044; F04B 17/046; F04B 17/048; F04B 53/10
See application file for complete search history.

(56) References Cited

U.S. PATENT DOCUMENTS

| 2,765,747 A * | 10/1956 | Aumick ................ F04B 7/0038 417/552 |
| 3,606,488 A * | 9/1971 | Beuchle et al. ........ B60T 13/16 303/61 |
| 2017/0051731 A1* | 2/2017 | Ott .......................... F04B 53/16 |

FOREIGN PATENT DOCUMENTS

| CN | 1778609 A | 5/2006 |
| CN | 102536723 A | 7/2012 |
| DE | 10 2014 204 157 A1 | 9/2015 |
| EP | 0088677 A1 * | 9/1983 .............. F04B 1/053 |

\* cited by examiner

*Primary Examiner* — Kenneth J Hansen
(74) *Attorney, Agent, or Firm* — Maginot, Moore & Beck LLP

(57) ABSTRACT

A pump device for a brake system of a motor vehicle has a housing, a pressure piston which delimits a pressure chamber in the housing for producing hydraulic pressure mounted in the housing in a longitudinally displaceable manner, a return spring assigned to the pressure piston, a non-return valve which separates the pressure chamber from a pressure connection and only removes the separation when the hydraulic pressure in the pressure chamber is greater than in the pressure connection, and an electromagnetic actuator which includes an armature and an electrically energizable solenoid. The armature is arranged on the pressure piston and the solenoid in and/or on the housing. The pressure piston has an axial through-channel which opens out into the pressure chamber at one end and is assigned to the non-return valve at the other end.

20 Claims, 1 Drawing Sheet

PUMP DEVICE FOR A BRAKE SYSTEM OF A MOTOR VEHICLE, BRAKE SYSTEM

This application claims priority under 35 U.S.C. § 119 to patent application no. DE 10 2019 210 666.8, filed on Jul. 18, 2019 in Germany, the disclosure of which is incorporated herein by reference in its entirety.

The disclosure relates to a pump device for a brake system of a motor vehicle, having a housing, having a pressure piston which delimits a pressure chamber in the housing for producing hydraulic pressure mounted in said housing in a longitudinally displaceable manner, having a return spring assigned to the pressure piston, having a non-return valve which separates the pressure chamber from a pressure connection and only removes the separation when the hydraulic pressure in the pressure chamber is greater than in the pressure connection, and having an electromagnetic actuator which comprises an armature and an electrically energizable solenoid, wherein the armature is arranged on the pressure piston and the solenoid in and/or on the housing.

The disclosure further relates to a brake system having at least one brake circuit comprising at least one hydraulically actuable wheel brake, and also having at least one pump device for generating hydraulic pressure in the brake circuit.

BACKGROUND

Pump devices and brake systems of the kind referred to above are known from the prior art. In order to allow hydraulic wheel brakes to be actuated independently of a brake pedal actuation or depending on a brake pedal actuation, but with the hydraulic or mechanical connection of the brake pedal to the wheel brake interrupted, it is known in the art for a pump device which is controllable, in particular electrically controllable, to be provided in a brake circuit to apply pressure to a wheel brake. With the help of a piston moved back and forth in an oscillating manner, hydraulic pressure is generated in a pressure chamber and made available to the brake system or brake circuit. A corresponding pump device is known from the unexamined patent document DE 10 2014 204 157 A1, for example. In this case, the pump piston is driven by an electromagnetic actuator against the force of a return spring, in order to carry out a pump movement or a pump action. During this process, a non-return valve prevents hydraulic medium from being able to flow out of the pressure connection back into the pressure chamber by automatically closing the connection between the pressure chamber and pressure connection when the pressure in the pressure connection is higher than in the pressure chamber. A reliable intake and expulsion of drawn-in hydraulic medium is thereby guaranteed.

SUMMARY

The pump device according to the disclosure having the features described herein has the advantage that with a reduced installation space requirement the pump device according to the disclosure, simple assembly and individual provision of a desired hydraulic pressure are guaranteed.

The pump device according to the disclosure is characterized in that the pressure piston has an axial through-channel which opens out into the pressure chamber at one end and is assigned to, or faces, the non-return valve at the other end. The hydraulic medium which is located in the pressure chamber and has pressure applied to it by a pressure piston movement, is thereby conveyed through the pressure piston to the non-return valve and therefore to the pressure connection. In this way, the pressure piston is moved out of the pump device against the flow direction of the pressurized hydraulic medium. By means of the through-channel in the pressure piston, a particularly compact configuration of the pump device is thereby facilitated. In particular, the advantageous embodiment allows the pump device to be configured overall as a plug-in device which can easily be plugged into a receiving means of a hydraulic block for assembly, so that a particularly simple assembly results through the overall preassembled or preassemblable pump device.

According to a preferred development of the disclosure, the pressure piston has a first front side assigned to the pressure chamber and a second front side assigned to the non-return valve, wherein a cross-sectional area of the first front side is greater than a cross-sectional area of the second front side. In particular, the total cross-sectional area of the first front side is greater than the total cross-sectional area of the second front side. This means that through the movement of the pressure piston in the pressure chamber, the volume of the pressure chamber reduced by movement is greater than the volume released where necessary by the movement of the pressure piston at the end of the pressure piston assigned to the non-return valve. In this way, generation of the desired hydraulic pressure and conveyance of the hydraulic medium in the desired direction are reliably guaranteed.

Furthermore, it is preferably provided that the return spring is held in a preloaded state between the first front side and a closed front surface of the housing which delimits the pressure chamber. In this way, the return spring as a whole lies in the pressure chamber which is delimited by the housing, the first front side of the pressure piston and the closed front surface of the housing. The volume of the pressure chamber is changed by the displacement of the pressure piston and the desired hydraulic pressure is thereby guaranteed. The arrangement of the return spring in the pressure chamber means that an installation space-optimized configuration is provided, wherein the return spring is, moreover, safe from external influences within the pressure chamber and a high durability and functionality of the pump device is thereby guaranteed.

Furthermore, it is preferably provided that the pressure piston has an inlet valve to connect an intake connection to the pressure chamber, wherein the inlet valve is formed by a valve sleeve co-forming the pressure channel and mounted in the pressure piston in a longitudinally displaceable manner. In the pressure piston, which is movable in a longitudinally displaceable manner relative to the housing, a valve sleeve is therefore arranged which is itself movable in a longitudinally displaceable manner relative to the pressure piston, in order to connect the intake connection to the pressure chamber or to separate it therefrom. Through the integrated configuration of the valve sleeve in the pressure piston and also through the co-formation of the pressure channel by the valve sleeve, a particularly compact embodiment of the pump device is provided. In addition, the inlet valve is thereby advantageously integrated in a simply assembled manner in the pump device. The return spring is preferably spaced radially from the valve sleeve, so that said valve sleeve does not interact with the return spring and can be moved independently of the pressure piston or the return spring force.

Furthermore, the pressure piston preferably has at least one radial opening in its casing wall assigned to the intake connection, which radial opening is hydraulically connected to the intake connection in each slide position of the pressure piston. It is thereby ensured that the intake connection is constantly hydraulically connected through the pressure piston to the valve sleeve or to the inlet valve.

Furthermore, it is preferably provided that the valve sleeve has at least one axial channel in its casing wall which, in a first sliding position of the valve sleeve in the pressure piston, connects the radial opening of the pressure piston to the pressure chamber and, in a second to sliding position separates it from the pressure chamber. The intake connection is thereby connected to the pressure chamber through the pressure piston or the radial opening of the pressure piston in the first sliding position of the valve sleeve and to the pressure chamber by the axial channel. If the valve sleeve is moved into the second sliding position, this connection is interrupted particularly by the closure of the axial channel by means of the valve sleeve. In this way, simple and reliable control of the inlet valve is guaranteed.

Particularly preferably, the valve sleeve has an annular seal seat in its end facing the pressure chamber, which seal seat rests against the pressure piston closing the axial channel in the second sliding position and is spaced apart from the pressure piston in the first sliding position. The axial channel can thereby be closed by the seal seat of the valve housing. At the same time, the seal seat defines the maximum penetration depth of the valve sleeve in the pressure piston, as a result of which simple assembly and reliable operation of the inlet valve are guaranteed.

The axial channel is preferably configured as a groove-shaped depression in an outer side of the casing wall of the valve housing. The groove-shaped depression makes an open-edged axial channel available which can be realized cost-effectively by comparison with an axial channel which is completely closed circumferentially. The axial channel is formed circumferentially by the groove-shaped depression of the valve sleeve, on the one hand, and the inner wall of the pressure piston, on the other hand, so that an advantageous interaction between the valve sleeve and the pressure piston and also a simple closure of the axial channel, in particular with the help of the seal seat already described previously, is made possible.

Furthermore, it is preferably provided that the axial channel is configured as a circumferential groove in the outer side of the casing wall of the valve sleeve. In this way, the axial channel extends over the entire circumference of the valve sleeve and, to this extent, is annular in design. In this way, a high volume flow is guaranteed on the one hand and, on the other, a blockage of the axial channel is reliably prevented, even when dirt or spurious particles are present.

The armature is preferably slid onto the pressure piston axially. In this way, a simple arrangement of the armature on the pressure piston is guaranteed.

Particularly preferably, the armature is connected to the pressure piston in the axial direction in a form-fitting manner, in particular by plastic deformation, preferably by at least one caulking. It is guaranteed by means of the form-fitted connection that the armature is constantly moved along with the pressure piston, so that an interaction between the electromagnetic actuator, pressure piston and return spring is constantly guaranteed.

Particularly preferably, the housing is configured as a plug-in housing for plugging into a hydraulic block of the brake system and has at least one radial projection on its outside, in order to guarantee an axial securing of the housing in, or on, the hydraulic block, in particular through plastic deformation of the hydraulic block. Its configuration as a plug-in housing means that simple assembly of the pump device on the hydraulic block of the brake system is guaranteed. The plug-in housing is particularly characterized in that, apart from the radial projection, it has a decreasing diameter in the plug-in direction or a diminishing/decreasing or constant cross-sectional area, in order to avoid undercuts and/or empty spaces in the housing. In this way, a reliable, form-fitting, advantageous arrangement of the housing or of the pump device in the hydraulic block is provided. The penetration depth of the plug-in housing in the hydraulic block is limited by the radial projection, for example. Furthermore, the radial projection is used, for example, so that through the plastic deformation of the hydraulic block, the plug-in housing, and therefore the pump device, can be securely locked to the hydraulic block, so that any unwanted detachment of the pump device from the hydraulic block is reliably prevented.

Particularly preferably, the housing has a multipart design and comprises a first housing part for receiving and mounting the pressure piston and the non-return valve, and also a second housing part for creating the pressure chamber and, in particular, for the displaceable mounting of the armature, wherein the housing parts are fixedly connected to one another. The multipart configuration of the housing means that a secure and simple preassembly of the pump device upstream of the arrangement in or on the hydraulic block of the brake system is guaranteed. Through the preferred embodiment for the mounting of the armature, secure guidance of the armature in the housing of the pump device is, moreover, guaranteed. The fixed connection of the housing parts to one another facilitates an advantageous preassembly.

The housing parts are preferably permanently connected to one another by plastic deformation, in particular by caulking. In this way, unwanted detachment is reliably prevented and a connection of the housing parts to one another in a permanently secure manner is guaranteed. In particular, the form-fitting connection means that a particularly robust connection is provided which is permanently guaranteed, even when there are high hydraulic pressures.

The brake system according to the disclosure having the features disclosed herein is characterized by the disclosed design of the pump device. The advantages already referred to result from this. In particular, the brake system has a hydraulic block which has one or multiple receiving depressions for receiving a pump device according to the disclosure in each case. In particular, the receiving depressions are configured as plug-in receiving means, so that the respective pump device can easily be plugged into the respective receiving means and can be secured, or is secured, to the hydraulic block there, in particular through a plastic deformation of the hydraulic block.

BRIEF DESCRIPTION OF THE DRAWINGS

Further advantages and preferred features and combinations of features result in particular from what has previously been described and also from the claims. The disclosure will be explained in greater detail below with the help of the drawing. In the drawing

DETAILED DESCRIPTION

Figure 1:
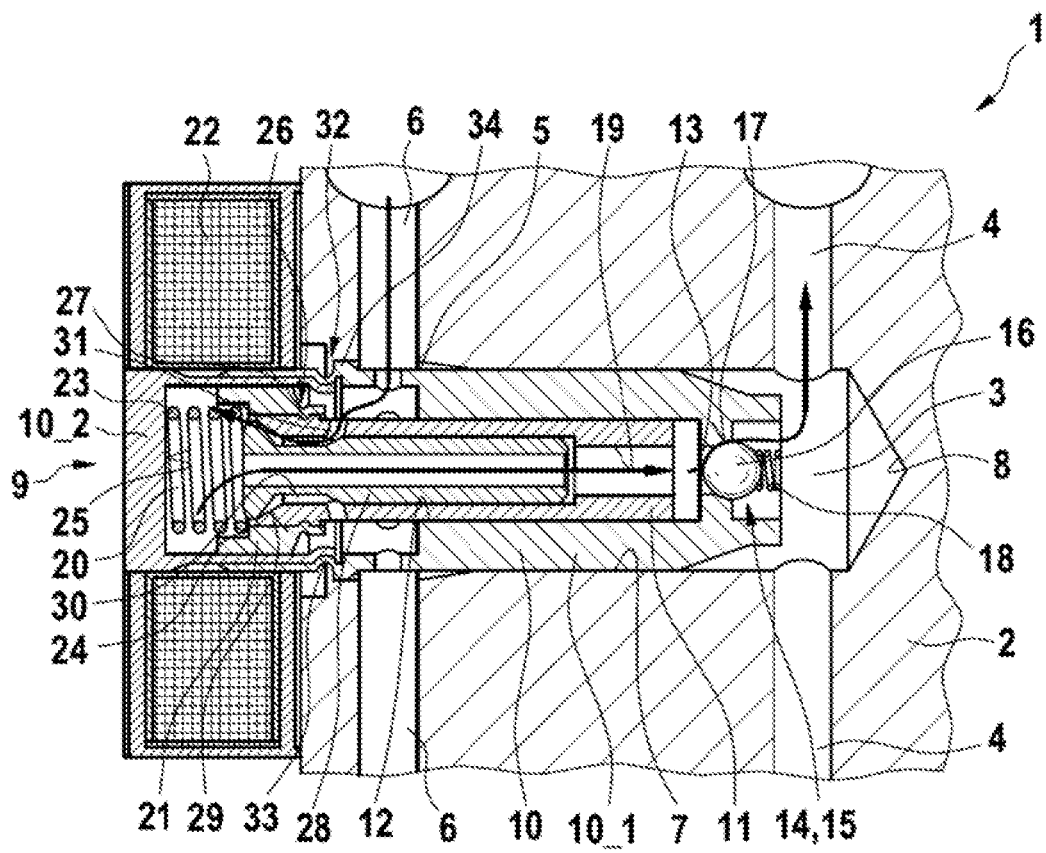
FIG. 1 shows an advantageous brake system for a motor vehicle as a simplified sectional representation in a first operating state and FIG. 2 shows a pump device of the brake system as a simplified longitudinal sectional representation in a second operating state.

FIG. 1 shows a part of an advantageous brake system 1 for a motor vehicle not depicted in greater detail here as a simplified longitudinal sectional depiction. The brake system 1 has a hydraulic block 2. Pressure channels and suction channels of the brake system for hydraulic medium, in particular for brake fluid, are combined together in the hydraulic block 2. Hence, the portion of the hydraulic block 2 shown in FIG. 1 comprises a pressure connection 3, from which two pressure channels 4 branch and lead to a friction brake of different brake circuits in each case or of a common brake circuit, for example. Furthermore, the present portion of the hydraulic block 2 shows an intake connection 5 into which two suction channels 6 open which are particularly connected to a tank for the provision and retention of the hydraulic medium and/or to a main brake cylinder of the brake system 1.

The pressure channels 4 and suction channels 6 open into a receiving depression 7 of the hydraulic block 2 which is cylindrical in design, wherein a diameter of the receiving depression 7 only increases, but does not decrease, starting from its base 8 in the direction of a free access opening, apart from plastic deformations which may be present which have occurred subsequently.

A pump device 9 is inserted into the receiving depression 7, by means of which hydraulic medium can be conveyed from the intake connection 5 to the pressure connection 3, wherein the pump device 9 itself separates the intake connection 5 from the pressure connection 3.

The pump device 9 comprises a housing 10 for this purpose which is configured as a plug-in housing. An outer diameter of the plug-in housing 10 in this case corresponds at least substantially to the inner diameter of the receiving depression 7, so that the housing 10 is inserted into the receiving depression 7 in a form-fitting manner at least substantially free from play, which receiving depression is to this extent configured as a plug-in receiving depression, as shown in FIG. 1. In particular, the outer circumference of the housing 10 is slightly larger than the inner diameter of the receiving depression 7, so that there is a press fit between the housing 10 and the hydraulic block 2 in the plugged-in state, through which the pressure connection 3 or the pressure side is reliably separated from the intake connection 5 or the intake side.

A pump piston 11 is mounted in a longitudinally displaceable manner in the housing 10 of the pump device 9. The housing 10 has a sleeve-shaped design for this purpose with a cup-shaped receiving means 12 for the pressure piston 11. In the base of the cup-shaped receiving means 12, the housing 10 has an outlet opening 13 which is assigned an outlet valve 14 in the form of a non-return valve 15. The non-return valve 15 has a spherical valve element 16 which interacts with a seal seat 17 formed by the side of the housing 10 facing away from the pressure piston 11 for the leak-proof closure of the outlet opening 13. The valve element 16 is forced into the valve seat 17 by a return spring 18 which is only shown here in outline, so that in the normal state the outlet opening 13 which opens into the pressure connection 3 is closed.

The pressure piston 11 has a through-channel 19 which extends axially through the pressure piston 11, so that the pressure channel 19 lies opposite the outlet valve 14 at one end. The other end of the pressure channel 19 faces a pressure chamber 20 which is delimited by the pressure piston 11 and the housing 10. At its end facing the pressure chamber 20, the pressure piston 11 supports an armature 21 which is designed to interact with a solenoid 22 arranged on the outside of the housing 10. The armature 21 in this case is guided in a longitudinally displaceable manner in the housing 10.

A return spring 23 is moreover arranged in the pressure chamber 20, which spring is held in a preloaded state between the pressure piston 11 and the housing 10. In this case, the pressure piston 11 has a first front side 24 facing the pressure chamber 20, which front side lies opposite a closed front surface 25 of the housing 10, so that the return spring 23 is held in a preloaded state between the first front side 24 and the front surface 25. In this case, the front side 24 is co-formed with the armature 21 in the present exemplary embodiment. The armature 21 is connected to the pressure piston 11 in a form-fitting manner, so that the pressure piston 11 and armature 21 are constantly moved with one another. For the form-fitting connection it is provided in this case that the armature is connected by caulking 26 which engages with a radial depression 27 in the piston 11. The armature 21 thereby forms part of the pressure piston 11.

The through-channel 19 of the pressure piston 11 is formed by a stepped bore, wherein a valve sleeve 28 is mounted in a longitudinally displaceable manner in a portion of the stepped bore facing the pressure chamber 20. The valve sleeve 28 projects axially outwards from the main body of the piston 11 with a free end facing the pressure chamber 20 and has a seal seat 29 at this end. In its casing wall, the valve sleeve 28 has on its outer side an axial channel 30 in the form of a circumferential groove which extends over the entire circumference of the valve sleeve 28. The circumferential groove 30 in this case is configured in such a manner that irrespective of its sliding position, the circumferential groove 30 is constantly hydraulically connected to a radial opening 31 formed in the pressure piston 11. The radial opening 31 of the pressure piston 11 in this case is configured in such a manner that it is constantly hydraulically connected to the intake connection 5, irrespective of the sliding position of the pressure piston 11.

In the sliding position of the valve sleeve 28 shown in FIG. 1, the seal seat 29 rests axially against the pressure piston 11 in such a manner that the axial channel 30, which runs between the inner wall of the pressure piston 11 and the outer wall of the valve sleeve 28, is closed. In this way, the hydraulic connection of the intake connection 5 to the pressure chamber 20 is interrupted.

Starting from the state described above, the following function emerges. If the solenoid 22 has an electrical current or electrical voltage applied to it, an electrical magnetic field is generated which interacts with the armature 21 and attracts said armature in such a manner that the return spring 23 is further compressed or loaded. The attraction of the armature 21 means that the pressure piston 11 is pushed in the direction of the pressure chamber 20, as a result of which said pressure chamber 20 is made smaller. By means of the internal pressure created in the pressure chamber 20 during the stroke movement of the pressure piston 11, it is guaranteed that the valve sleeve 28 is pressed axially against the pressure piston 11 and thereby closes the axial channel 30. The pressure thereby applied to the hydraulic medium located in the pressure chamber 20 ensures that the hydraulic medium reaches the outlet valve 13 through the through-channel 19 which is co-formed by the valve sleeve 28. If the pressure in this case is higher than the pressure in the pressure connection 3 and the restoring force of the optional return spring 18, the valve element 16 is displaced from the closed position shown in FIG. 1 into an open position releasing the outlet opening 13 and the hydraulic medium flows into the pressure connection 3 and therefore into the pressure channels 4.

Figure 2:
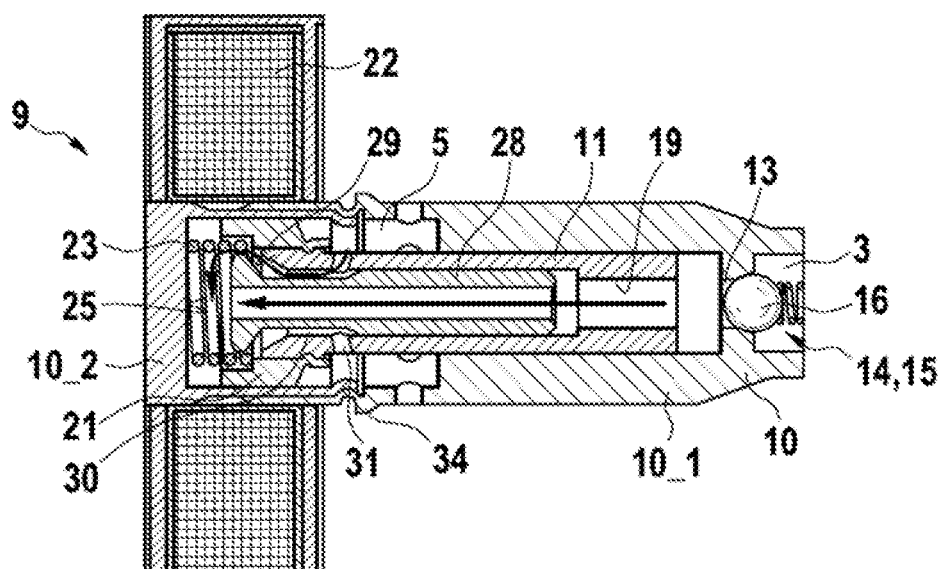

If energization of the solenoid 22 ends, the return spring 23 presses the pressure piston 11 back into its initial position. FIG. 2 once again shows the pump device 9 in a simplified longitudinal presentation in this respect, however this is in a second actuation state in which the inlet valve formed by the valve sleeve 28 an the pressure piston 11 is open. The pushing back of the pressure piston 11 causes the distance between the valve sleeve 28 and pressure piston 11 and the seal seat 29 to be enlarged, so that hydraulic medium flows from the intake connection 5 into the pressure chamber 20, as shown by arrows in FIG. 2. The fact that during the return movement of the pressure piston 11 the pressure chamber 20 is enlarged once again means that a negative pressure is created through which the valve sleeve 28 is drawn away from the pressure piston 11 in such a manner that the sealing surface 28 becomes detached from the pressure piston 11 and thereby opens the inlet valve, as a consequence of which hydraulic medium flows from the intake connection 5 into the pressure chamber 20.

The return spring is, however, only optionally present at this point. According to a further exemplary embodiment, the valve element 14 is pressed against the valve seat 17 in a sealing manner simply through the static pressure in the pressure connection 3.

For a simple assembly of the brake system 1 and, in particular of the pump device 9, the housing 10 of the pump device 9 has at least one radial projection 34 on its outer wall. Once the housing 10, in particular the pre-assembled pump device 9 with the housing 10, has been plugged into the receiving depression 7, as shown in FIG. 1, the hydraulic block 2 is plastically deformed, in particular by caulking, in the region of the radial projection 34, so that the radial projection 34 is engaged behind by the material of the hydraulic block 2, as shown by caulking 32 in FIG. 1. In this way, the pump device 9 is held securely and permanently on the hydraulic block 2, in particular also in a sealing manner.

Furthermore, for ease of assembly the housing 10 comprises multiple parts. According to the present exemplary embodiment, the housing 10 is configured in two parts, wherein a first housing part 10_1 creates the plug-in housing already referred to which is plugged into the receiving depression 7. A second housing part 10_2 is fastened to the housing part 10_1 at the end of the housing part 10_1 facing away from the outlet opening 13. For this purpose, the cup-shaped housing part 10_2 is inserted into the housing part 10_1 and, in particular, permanently connected to the housing part 10_1 in a form-fitting manner through plastic deformation, as shown in FIG. 1 through caulking 33 of the housing part 10_1. In this case, the housing part 10_2 along with the pressure piston 11 forms the pressure chamber 20 and, moreover, is used for the longitudinally displaceable mounting of the armature 21 and therefore of the pressure piston 11 in the housing 10.

In particular, the valve housing 28 can be smoothly mounted in the pressure piston 11 in a displaceable manner with little leakage and its sleeve shape means that it has a through-flow opening which extends in the longitudinal extent of the valve sleeve 28 and co-forms the through-channel 19. Preferably, it is not only the armature 21 that is produced from a magnetically conductive material, but also the pressure piston 11 as a whole, so that the action of the electromagnetic actuator is improved. The valve seats at the outlet opening 13 and the inlet opening that can be formed between the valve sleeve 28 and the pressure piston 11 are preferably made of plastic, in order to achieve a high sealing effect in the closed state through an at least sectionally elastic deformation. A magnetic separation of the armature 29 and the pole surface of the solenoid can be represented by a thin wall thickness in the housing 10. The contour of the pressure piston 11 is preferably configured in such a manner that the force on the pressure piston 11 over its entire stroke remains at least substantially identical or constant.

Through the advantageous embodiment of the pump device 9 as a plug-in or insertion module or in cartridge form, a simple assembly of the pump device 9 in/on the hydraulic body 2 is guaranteed. The hydraulic body 2 preferably has multiple receiving depressions 2 into which a correspondingly configured pump device 9 can be plugged in each case. In this way, a simple assembly of the brake system 1 overall is guaranteed. Particularly preferably, the pump device is produced as a preassembly group without a solenoid, so that a simple insertion and locking of the pump device 9 to the hydraulic pressure 2 is guaranteed. The solenoid 22 is then mounted subsequently. The fact that the armature 29 itself has hydraulic medium flowing through it means that an advantageous cooling of the electromagnetic actuator results.

The fact that the pump device 9 can be individually controlled electromagnetically gives rise to an installation space-saving design of said pump device and also an individual actuation of multiple pump devices 9 that may be present. Moreover, moved seals can be outwardly dispensed with, without this leading to a risk of leaks or air intake. The formation of the solenoid 22 as a separate component moreover gives rise to the advantage of a modular system which allows simplified assembly.

The invention claimed is:

1. A pump device for a brake system of a motor vehicle, comprising:
    a housing;
    a pressure piston that defines a pressure chamber in the housing and is mounted in said housing in a longitudinally displaceable manner in such a way that a first hydraulic pressure in the pressure chamber is increased by a longitudinal movement of the pressure piston;
    a return spring assigned to the pressure piston;
    a non-return valve configured to hydraulically separate the pressure chamber from a pressure connection and to allow flow between the pressure chamber and the pressure connection only when the first hydraulic pressure in the pressure chamber is greater than a second hydraulic pressure in the pressure connection; and
    an electromagnetic actuator comprising an armature and an electrically energizable solenoid, the armature arranged on the pressure piston and the solenoid is arranged in and/or on the housing,
    wherein the pressure piston defines an axial through-channel having a first end and a second end, the axial through-channel opens out into the pressure chamber at the first end and is assigned to the non-return valve at the second end, and
    wherein the pressure piston has a pressure piston casing wall that defines at least one radial opening assigned to an intake connection and that, in at least one slide position of the pressure piston, hydraulically connects the intake connection to the pressure chamber, the radial opening being hydraulically connected to the intake connection in all slide positions of the pressure piston.

2. The pump device according to claim 1, wherein:
    the pressure piston has a first front side assigned to the pressure chamber and a second front side assigned to the non-return valve, and
    a first cross-sectional area of the first front side is greater than a second cross-sectional area of the second front side.

3. The pump device according to claim 2, wherein:
the housing includes a closed front surface that defines the pressure chamber, and
the return spring is held in a preloaded state between the first front side and the closed front surface of the housing.

4. The pump device according to claim 1, wherein the pressure piston includes an inlet valve that connects the intake connection to the pressure chamber, the inlet valve comprising a valve sleeve that partially defines the axial through-channel and is mounted in the pressure piston in a longitudinally displaceable manner.

5. The pump device according to claim 4, wherein the valve sleeve includes a valve sleeve casing wall that defines at least one axial channel which, in a first sliding position of the valve sleeve in the pressure piston, connects the at least one radial opening of the pressure piston to the pressure chamber and, in a second sliding position separates the at least one radial opening from the pressure chamber.

6. The pump device according to claim 5, wherein:
an end of the valve sleeve facing toward the pressure chamber comprises an annular seal seat that rests against the pressure piston so as to close the at least one axial channel in the second sliding position, and
the axial channel is spaced apart from the pressure piston in a releasing manner in the first sliding position.

7. The pump device according to claim 5, wherein the axial channel is configured as a groove-shaped depression in an outer side of a valve housing casing wall of the valve housing.

8. The pump device according to claim 5, wherein the axial channel is defined by a circumferential groove in an outer side of the valve sleeve casing wall.

9. The pump device according to claim 1, wherein the armature is slid axially onto the pressure piston.

10. The pump device according to claim 1, wherein the armature is connected to the pressure piston in an axial direction in a form-fitting manner.

11. The pump device according to claim 10, wherein the armature is connected to the pressure piston in the axial direction by at least one caulking.

12. The pump device according to claim 1, wherein the housing is configured as a plug-in housing configured to plug into a hydraulic block of the brake system, the housing including at least one radial projection on an outside of the housing that is configured to axially secure the housing in the hydraulic block.

13. The pump device according to claim 12, wherein the radial projection is configured to plastically deform the hydraulic block so as to secure the housing in the hydraulic block.

14. The pump device according to claim 1, wherein the housing is of multipart design and comprises:
a first housing part in which the pressure piston and the non-return valve are received and mounted; and
a second housing part that closes the pressure chamber, wherein the first and second housing parts are fixedly connected to one another.

15. The pump device according to claim 14, wherein the armature is displaceably mounted in the second housing part.

16. The pump device according to claim 14, wherein the first and second housing parts are permanently connected to one another by plastic deformation.

17. The pump device according to claim 16, wherein the first and second housing parts are permanently connected to one another by caulking.

18. A brake system for a motor vehicle comprising:
at least one brake circuit comprising at least one hydraulically actuable wheel brake; and
at least one pump device configured to generate hydraulic pressure in the at least one brake circuit, the at least one pump device comprising:
a housing;
a pressure piston that defines a pressure chamber in the housing and is mounted in said housing in a longitudinally displaceable manner in such a way that a first hydraulic pressure in the pressure chamber is increased by a longitudinal movement of the pressure piston;
a return spring assigned to the pressure piston;
a non-return valve configured to hydraulically separate the pressure chamber from a pressure connection and to allow flow between the pressure chamber and the pressure connection only when the first hydraulic pressure in the pressure chamber is greater than a second hydraulic pressure in the pressure connection; and
an electromagnetic actuator comprising an armature and an electrically energizable solenoid, the armature arranged on the pressure piston and the solenoid is arranged in and/or on the housing,
wherein the pressure piston defines an axial through-channel having a first end and a second end, the axial through-channel opens out into the pressure chamber at the first end and is assigned to the non-return valve at the second end, and
wherein the pressure piston has a pressure piston casing wall that defines at least one radial opening assigned to an intake connection and that, in at least one slide position of the pressure piston, hydraulically connects the intake connection to the pressure chamber, the radial opening being hydraulically connected to the intake connection in all slide positions of the pressure piston.

19. A pump device for a brake system of a motor vehicle, comprising:
a housing;
a pressure piston that defines a pressure chamber in the housing and is configured to produce hydraulic pressure, the pressure piston mounted in said housing in a longitudinally displaceable manner;
a return spring assigned to the pressure piston;
a non-return valve configured to hydraulically separate the pressure chamber from a pressure connection and to allow flow between the pressure chamber and the pressure connection only when a first hydraulic pressure in the pressure chamber is greater than a second hydraulic pressure in the pressure connection; and
an electromagnetic actuator comprising an armature and an electrically energizable solenoid, the armature arranged on the pressure piston and the solenoid is arranged in and/or on the housing,
wherein the pressure piston defines an axial through-channel having a first end and a second end, the axial through-channel opens out into the pressure chamber at the first end and is assigned to the non-return valve at the second end, and
wherein the pressure piston includes an inlet valve that connects connect an intake connection to the pressure chamber, the inlet valve comprising a valve sleeve that partially defines the axial through-channel and is mounted in the pressure piston in a longitudinally displaceable manner.

20. The pump device according to claim 19, wherein the pressure piston has a pressure piston casing wall that defines at least one radial opening assigned to the intake connection, the radial opening being hydraulically connected to the intake connection in all slide positions of the pressure piston.

* * * * *